United States Patent [19]

Asanuma et al.

[11] Patent Number: 5,187,250

[45] Date of Patent: * Feb. 16, 1993

[54] POLY-α-OLEFINS

[75] Inventors: Tadashi Asanuma, Osaka; Tetsunosuke Shiomura, Tokyo; Yukari Nishimori; Nobutaka Uchikawa, both of Osaka, all of Japan

[73] Assignee: Mitsui Toatsu Chemicals, Incorporated, Tokyo, Japan

[ * ] Notice: The portion of the term of this patent subsequent to Oct. 20, 2009 has been disclaimed.

[21] Appl. No.: 813,057

[22] Filed: Dec. 23, 1991

Related U.S. Application Data

[63] Continuation of Ser. No. 533,520, Jun. 5, 1990, abandoned.

[30] Foreign Application Priority Data

Jun. 5, 1989 [JP] Japan ................................. 1-141168
Jun. 21, 1989 [JP] Japan ................................. 1-156707
Sep. 5, 1989 [JP] Japan ................................. 1-228369
Oct. 11, 1989 [JP] Japan ................................. 1-262966
Oct. 27, 1989 [JP] Japan ................................. 1-278617
Oct. 27, 1989 [JP] Japan ................................. 1-278618
Jan. 10, 1990 [JP] Japan ................................. 2-001450

[51] Int. Cl.$^5$ ................... C08F 110/08; C08F 110/14
[52] U.S. Cl. ................... 526/348.6; 526/160; 526/348.2; 526/348.3; 526/348.5
[58] Field of Search ................... 526/160, 348.3, 348.2, 526/348.5, 348.6

[56] References Cited

U.S. PATENT DOCUMENTS 4,892,851 1/1990 Ewen et al. .................. 526/160 X

FOREIGN PATENT DOCUMENTS 0351392  1/1990 European Pat. Off. .
62-187708 8/1987 Japan .
1-131263  5/1989 Japan .
86/02667  6/1987 World Int. Prop. O. .

OTHER PUBLICATIONS

*Journal Of The American Chemical Society*, vol. 110, 1988, pp. 6255–6256, American Chemical Society; J. A. Ewen et al.

Primary Examiner—Joseph L. Schofer
Attorney, Agent, or Firm—Burns, Doane, Swecker & Mathis

[57] ABSTRACT

A poly-α-olefin of novel structure which is an addition polymer of an α-olefin having 4 carbon atoms or more, wherein (a) by the analysis of the peaks attributable to the side chain methylene groups directly bonded to the main chain in the $^{13}$C-NMR spectrum produced by the measurement in 1,2,4-trichloro-benzene, (i) a novel main peak not attributable to the isotactic structure thereof is positioned on the side of higher magnetic field than is the peak attributable to the isotactic structure, and (ii) the intensity of said main peak is 0.3 or more relative to the sum of the intensities of the total peaks attributable to the side chain methylene groups directly bonded to the main chain, and (b) the molecular weight measured by gel permeation chromatography and calculated as polypropylene is not less than 1,000.

8 Claims, 13 Drawing Sheets

POLY-α-OLEFINS

This application is a continuation of application Ser. No. 07/533,520, filed Jun. 5, 1990, now abandoned.

BACKGROUND OF THE INVENTION

1. Field of the Invention

This invention relates to a poly-α-olefin of novel stereostructure.

2. Description of the Prior Art

It has been well known to date that poly-α-olefins have isotactic or atactic structure as their stereoforms. With regard to those having syndiotactic structure, however, syndiotactic polypropylene and syndiotactic polystyrene of relatively low tacticities (Japanese Patent Laid-Open No. 187708/'87 and others), hydrogenated products of these syndiotactic polymers (Japanese Patent Laid-Open No. 131263/'89), and the like have only been disclosed. On the other hand, J. A. Ewen et al. have discovered a process for producing a polypropylene by the use of a catalyst comprising a transition metal compound having an asymmetric ligand and an aluminoxane, the process being featured by the high activity per unit amount of the transition metal and the high syndiotacticity of the resulting polymer (J. Am. Chem. Soc., 1988, 110, 6255-6256).

There have not been known up to date α-olefin polymers of 4 carbon atoms or more which are not of isotactic or atactic structure but have a novel stereoregularity. If these polymers are available, however, it will be expected to use them in a variety of applications based on their stereospecific nature.

SUMMARY OF THE INVENTION

The present inventors have made intensive investigations into novel stereoregular poly-α-olefins, leading to completion of the present invention.

Thus, the present invention provides a poly-α-olefin of novel structure which is an addition polymer of an α-olefin having 4 carbon atoms or more, wherein (a) by the analysis of the peaks attributable to the side chain methylene groups directly bonded to the main chain in the $^{13}$C-NMR spectrum produced by the measurement in 1,2,4-trichlorobenzene, (i) a novel main peak not attributable to the isotactic structure thereof is positioned on the side of higher magnetic field than is the peak attributable to the isotactic structure, and (ii) the intensity of said main peak is 0.3 or more relative to the sum of the intensities of the total peaks attributable to the side chain methylene groups directly bonded to the main chain, and (b) the molecular weight measured by gel permeation chromatography and calculated as polypropylene is not less than 1,000.

The $^{13}$C-NMR spectrum is obtained through measurement in a 1,2,4-trichlorobenzene solution of the polymer on the basis of tetramethylsilane. Among the peaks attributable to the side chain methylene groups directly bonded to the main chain, the above-described main peak indicates the absorption by the syndiotactic bonds, and therefore the ratio of the intensity of the main peak to the sum of the intensities of the total peaks attributable to the side chain methylene groups directly bonded to the main chain can be regarded as a measure representing the syndiotacticity of the poly-α-olefin of the present invention. The attribution of the peaks in the spectrum is based on C. P. Lindeman et al.; Anal. Chem., Vol. 43, 1245 (1971).

Although the poly-α-olefins of the present invention can be used singly, they are particularly useful when used as modifying agents for other thermoplastic resins.

With their novel stereoregularity, poly-α-olefins of the present invention can be expected to be used in new applications based on their stereospecific nature and hence are of extreme industrial value.

BRIEF DESCRIPTION OF THE DRAWINGS

In FIG. 2, (a) is the $^{13}$C-NMR spectrum of a syndiotactic polypentene-1, while (b) shows that of an isotactic polypentene-1. In FIG. 4, (a) is the $^{13}$C-NMR spectrum of a syndiotactic polyhexene-1, while (b) shows that of an isotactic polyhexene-1. In FIG. 7, (a) shows the $^{13}$C-NMR spectrum of a syndiotactic polyoctene-1, and (b) is that of an isotactic polyoctene-1. FIG. 8 is the infrared absorption spectrum of the syndiotactic polyoctene-1, while In FIG. 10, (a) indicates the $^{13}$C-NMR spectrum of a syndiotactic polyhexadecene-1 and (b) shows that of an isotactic polyhexadecene-1. In FIG. 11, (a) is the X-ray diffraction spectrum of the syndiotactic polyhexadecene-1, while (b) gives that of the isotactic polyhexadecene-1. In FIG. 12, (a) is the $^{13}$C-NMR spectrum of a syndiotactic polyoctadecene-1 and (b) shows that of an isotactic polyoctadecene-1. In FIG. 13, (a) gives the X-ray diffraction spectrum of the syndiotactic polyoctadecene-1 while (b) illustrates that of the isotactic polyoctadecene-1.

DETAILED DESCRIPTION OF THE INVENTION

Poly-α-olefins of the present invention are assumed to have primarily a syndiotactic structure. Investigation into the peaks attributable to the side chain methylene groups bonded to the main chain in their $^{13}$C-NMR spectrums has characteristically shown that a novel main peak not attributable to the isotactic structure is positioned on the side of higher magnetic field than is the peak attributable to the isotactic structure and the syndiotactic stereoregularity is so high that the intensity of the main peak relative to the sum of the intensities of the total peaks attributable to the methylene groups directly bonded to the main chain in the side chains may attain 0.3 or more, preferably 0.5 or more. Poly-α-olefins of low stereoregularity, such as those having the intensity ratio of less than 0.3, are beyond the scope of the present invention.

In order that the polymers of the present invention may exhibit their characteristic features, it is necessary for the polymers to have a molecular weight of 1,000 or more, as measured by gel permeation chromatography and calculated as polypropylene. No polymers are useful, which have lower molecular weights than this value. The molecular weight is measured, for example, by gel permeation chromatography at 135° C. in a 1,2,4-trichlorobenzene solution and calculated as a number average molecular weight as calculated as polypropylene.

Then, the preparation process of poly-α-olefins of the present invention will be disclosed and illustrated.

The catalyst useful for the polymerization of α-olefins to produce novel stereoregular poly-α-olefins in the present invention is a catalyst comprising a transition metal compound having an asymmetric and mutually linking ligand (an asymmetric ligand with the ends mutually linked). The transition metal compound having an asymmetric and mutually linked ligand is a compound having a ligand represented by the general formula A—B—C wherein A and C are individually a different aromatic or cyclic unsaturated group and B is an alkylene or cycloalkylene group having 1-20 carbon atoms, and is represented by the general formula:

wherein A, B and C are as described above, M denotes titanium, zirconium or hafnium, and D is an alkyl group having 1-20 carbon atoms or a halogen atom. Preferred examples of the aromatic or cyclic unsaturated group include cyclopentadienyl, indenyl and fluorenyl groups and groups of ring substitution products thereof, and ligands containing a cyclopentadienyl group on one side and an indenyl or fluorenyl group or groups of ring substitution products thereof on the other may be cited as an example. More specifically, the compounds illustrated in a literature (J. A. Ewen et al.; J. Am. Chem. Soc., 1988, 110, 6255–6256), such as isopropyl(cyclopentadienyl-1-fluorenyl)hafnium dichloride and isopropyl(cyclopentadienyl-1-fluorenyl)-zirdonium dichloride may preferably be used as the transition metal compound.

An aluminoxane is generally used jointly in the polymerization. The aluminoxane is a compound represented by the general formula wherein R is a hydrocarbon residue 1-3 carbon atoms. The compounds wherein R is a methyl group, i.e. methylaluminoxane, and n is 5 or more, preferably 10-100, are particularly used. The proportion of the aluminoxane used is 10 to 1,000,000 mole times, usually 50 to 5,000 mole times based on the foregoing transition metal compound. In addition to such catalyst systems, it is also possible to use those catalyst systems which comprise the aforesaid transition metal compound, in which at least one of the Ds is an alkyl group, in combination with a boron compound shown, for example, in Japanese Patent Laid-Open Nos. 501950/'89 and 502036/'89.

α-Olefins to be used in the production of the polymers of the present invention are those having 4 to 20 carbon atoms and represented by the general formula $CH_2=CH—CHCH_2—CH_2—R'$ wherein R' is a hydrogen atom or an alkyl group of 1 to 16 carbon atoms. Specific example of useful α-olefins may include butene-1, pentene-1, hexene-1, heptene-1, octene-1, nonene-1, decene-1, undecene-1, dodecene-1, tridecene-1, pentadecene-1, hexadecene-1, heptadecene-1, octadecene-1, 5-methylhexene-1, etc.

No particular restrictions are imposed on the conditions for the polymerization of α-olefins to produce their polymers. Thus, various polymerization techniques may be used, including the solvent polymerization process using inert solvents, the bulk polymerization process using α-olefins as the polymerization medium in the substantial absence of inert solvents, and the gas phase polymerization process. It is common practice to carry out the polymerization at a temperature of $-100°$ to 200° C. and a pressure of atmospheric pressure to 20 kg/cm²G Temperatures of $-100°$ to 100° C. and pressures of atmospheric pressure to 10 kg/cm²G are preferred.

The poly-α-olefins of the present invention may embrace not only homopolymers of the aforesaid α-olefins but also copolymers thereof with small quantities, say 10 mol % or less, of other α-olefins, as far as their stereoform can exhibit specific measurements in the $^{13}C$-NMR spectrums.

The present invention will be illustrated more specifically by reference to the following Examples.

Example 1

To 20 g of butene-1 in an autoclave with an inner volume of 300 ml were added 5 mg of isopropyl(cyclopentadienyl-1-fluorenyl)zirconium dichloride and 0.34 g of methylaluminoxane having a polymerization degree of about 15. Here, the isopropyl(cyclopentadienyl-1-fluorenyl)zirconium dichloride had been obtained by introducing lithium into isopropylcyclopentadienyl-1-fluorene synthesized in an ordinary manner and then reacting the resulting compound with zirconium tetrachloride, while the methylaluminoxane had been obtained by reacting copper sulfate hexahydrate with trimethylaluminium in toluene. The resulting mixture was subjected to polymerization at 25° C. for 5 hours, and thereafter unreacted butene-1 was removed by evaporation. The vaporization residue was dissolved in 50 ml of hexane, and the solution was added to 500 ml of methanol to obtain 7.5 g of polybutene-1 as a deposited insoluble matter. When measured with its 1,2,4-trichlorobenzene solution at 135° C. by GPC150C gel permeation chromatography manufactured by Waters Ltd. and calculated in terms of polypropylene, its number average molecular weight and weight average molecular weight were respectively 14,500 and 30,000. The intrinsic viscosity measured in a tetralin solution at 135° C. was 0.17. The $^{13}C$-NMR spectrum was measured with its 1,2,4-trichlorobenzene solution on the basis of 0 ppm tetramethylsilane, with the result that 4 absorption peaks were found at 40.7, 35.0, 26.9 and 10.7 ppm.

Figure 1:
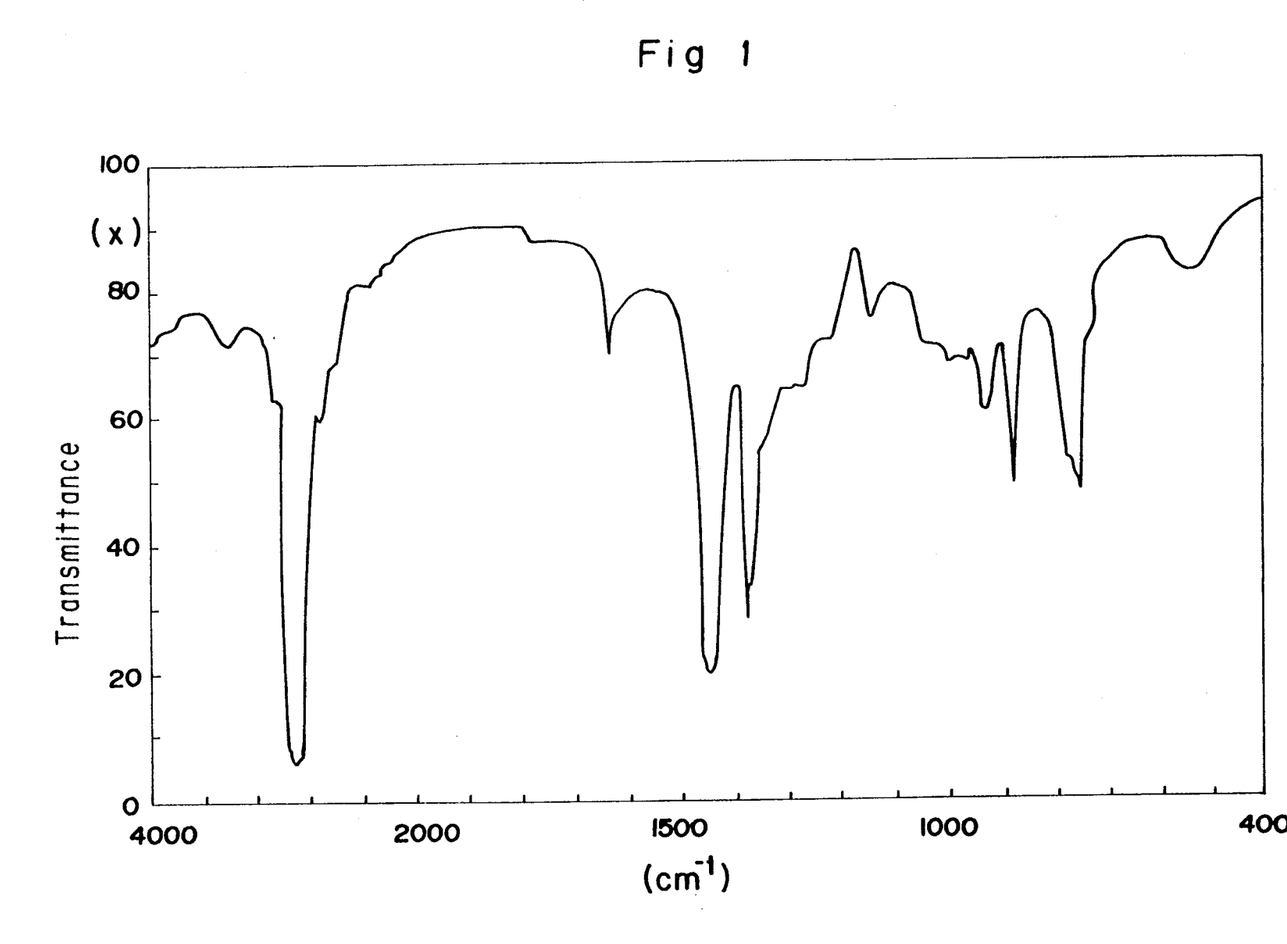
FIG. 1 is the infrared spectrum of a syndiotactic polybutene-1.

Among the absorptions by the side chain $CH_2$ groups directly bonded to the main chain, the intensity of absorption by the syndiotactic pentad bonds at 26.9 ppm was 0.89 relative to the sum of the intensities of absorption by the $CH_2$ groups directly bonded to the main chain in the whole side chains. The measurements of the infrared absorption spectrum are shown in FIG. 1.

The peaks in the $^{13}C$-NMR spectrum of isotactic polybutene-1 (synthesized in accordance with the method of A. Zammbelli et al.; Macromolecules 1987, vol. 20, 1015) were observed at 40.3, 35.1, 27.7 and 10.7 ppm in the same manner as described above. The assignment of the $^{13}C$-NMR spectrum was based on T. Asakura et al.; Macromolecules vol. 16, 786 (1983).

EXAMPLE 2

To 20 g of pentene-1 in a flask with a content of 300 ml were added 5 mg of isopropyl(cyclopentadienyl-1-fluorenyl)zirconium dichloride used in Example 1 and 0.34 g of methylaluminoxane having a polymerization degree of about 16 manufactured by Toso Akuzo K.K. The mixture was subjected to polymerization at 5° C. for 2 hours and then charged in a large quantity of methanol to obtain 8.2 g of polypentene-1 as a methanol insoluble matter. Its analysis conducted in the same way as in Example 1 gave a number average molecular weight of 25,000 and a weight average molecular weight of 50,000, as calculated as polypropylene. The intrinsic viscosity measured in a tetraline solution at 135° C. was 0.52. Five main peaks were observed at around 14.9, 19.9, 33.5, 37.5 and 42.0 ppm in the $^{13}C$-NMR spectrum obtained in the same way.

Figures 2A, 2B:
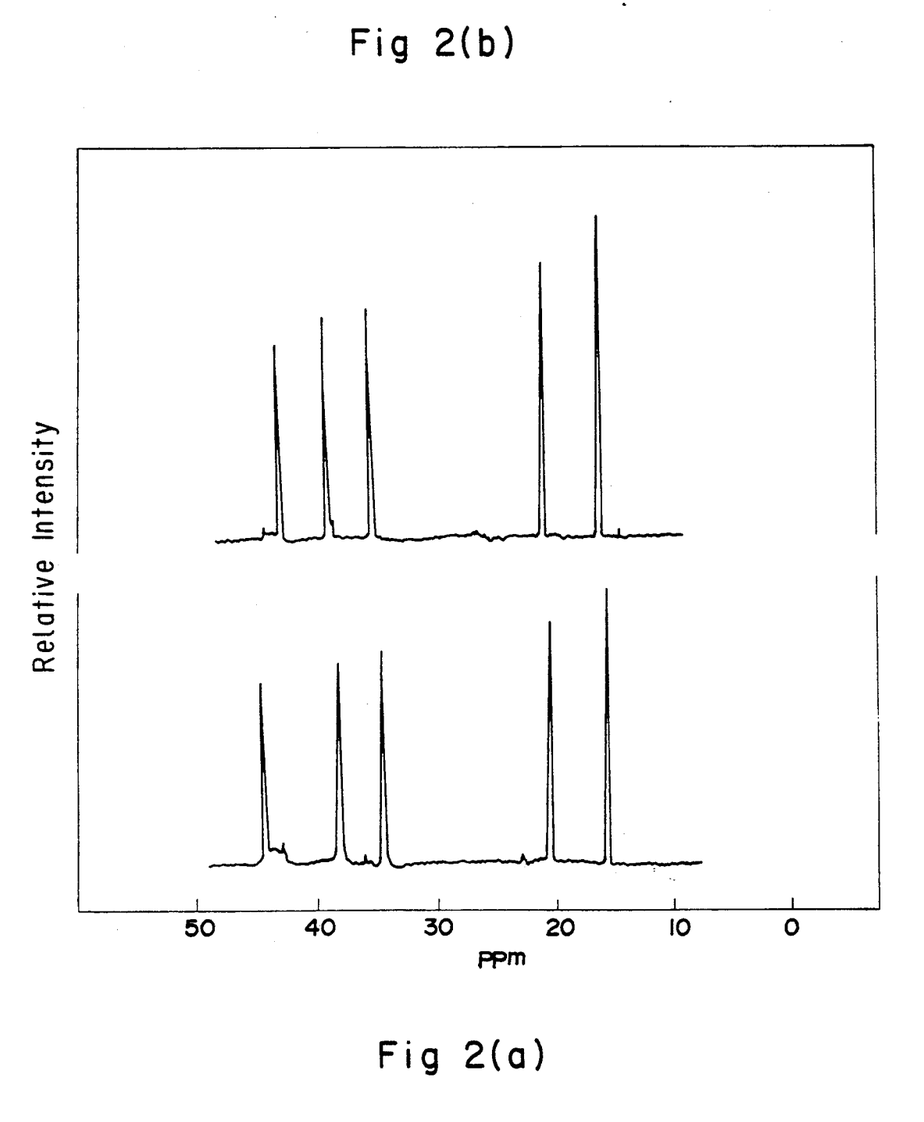
Figure 3:
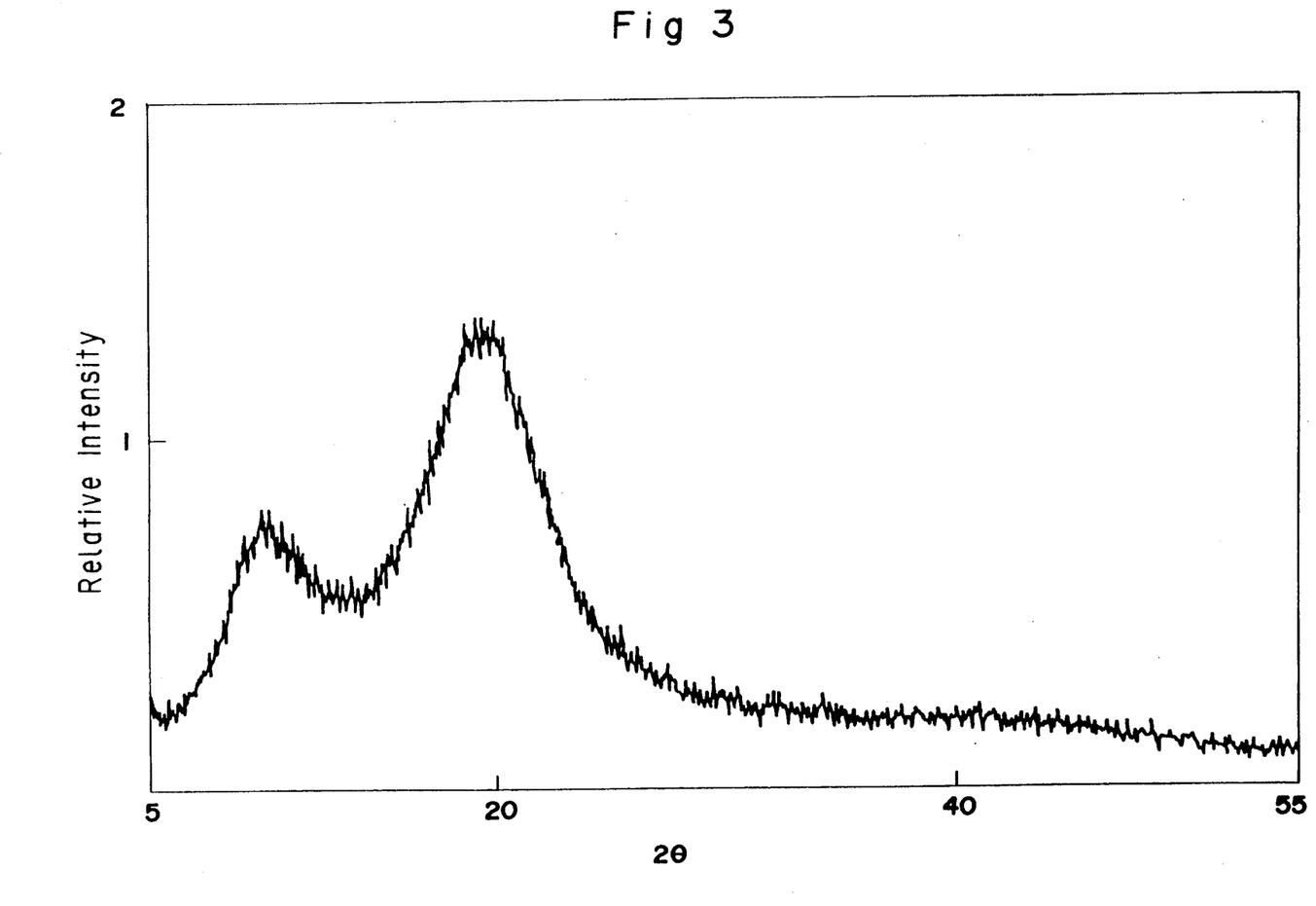
FIG. 3 illustrates the X-ray diffraction spectrum of the syndiotactic polypentene-1.

Among the absorptions by the side chain $CH_2$ groups directly bonded to the main chain, the intensity of absorption by the syndiotactic bonds at 37.5 ppm was 0.72 relative to the sum of the intensities of absorption by the side chain $CH_2$ groups directly bonded to the main chain. The measurements of the $^{13}C$-NMR absorption spectrum are shown in FIG. 2 (a), while those of the X-ray diffraction spectrum (Cu—Kα) are illustrated in FIG. 3.

Isotactic polypentene-1 could be obtained in an amount of 6.8 g through polymerization catalyzed by 1,2-ethylenebis-indenylzirconium dichloride according to the same procedure. Its $^{13}C$-NMR was measured in the same way, as a result of which 5 absorption peaks were recognized at around 14.6, 19.9, 33.5, 38.1 and 41.4 ppm (these values accord with those obtained by correcting the shifted values by the difference of base material from the values shown by P. Localelli et al.; Makromol. Chem. Rapid Commun., vol. 15, 495–499). The measurements of the $^{13}C$-NMR absorption spectrum are shown in FIG. 2 (b).

EXAMPLE 3

The same amount of the same catalyst as used in Example 1 was added to 100 g of hexene-1 in a flask with a content of 300 ml. The mixture was subjected to polymerization under agitation at 25° C. for 5 hours. The resulting mixture was treated in the same manner as in Example 1 to obtain a polymer. The polymer thus-obtained was analyzed in the same manner and was found to have a number average molecular weight of 35,000 and a weight average molecular weight of 64,000, as calculated in terms of polypropylene. Six main absorption peaks were observed at around 14.1, 23.5, 29.2, 33.8, 34.7 and 42.1 ppm in the measurements by $^{13}C$-NMR.

Figures 4A, 4B:
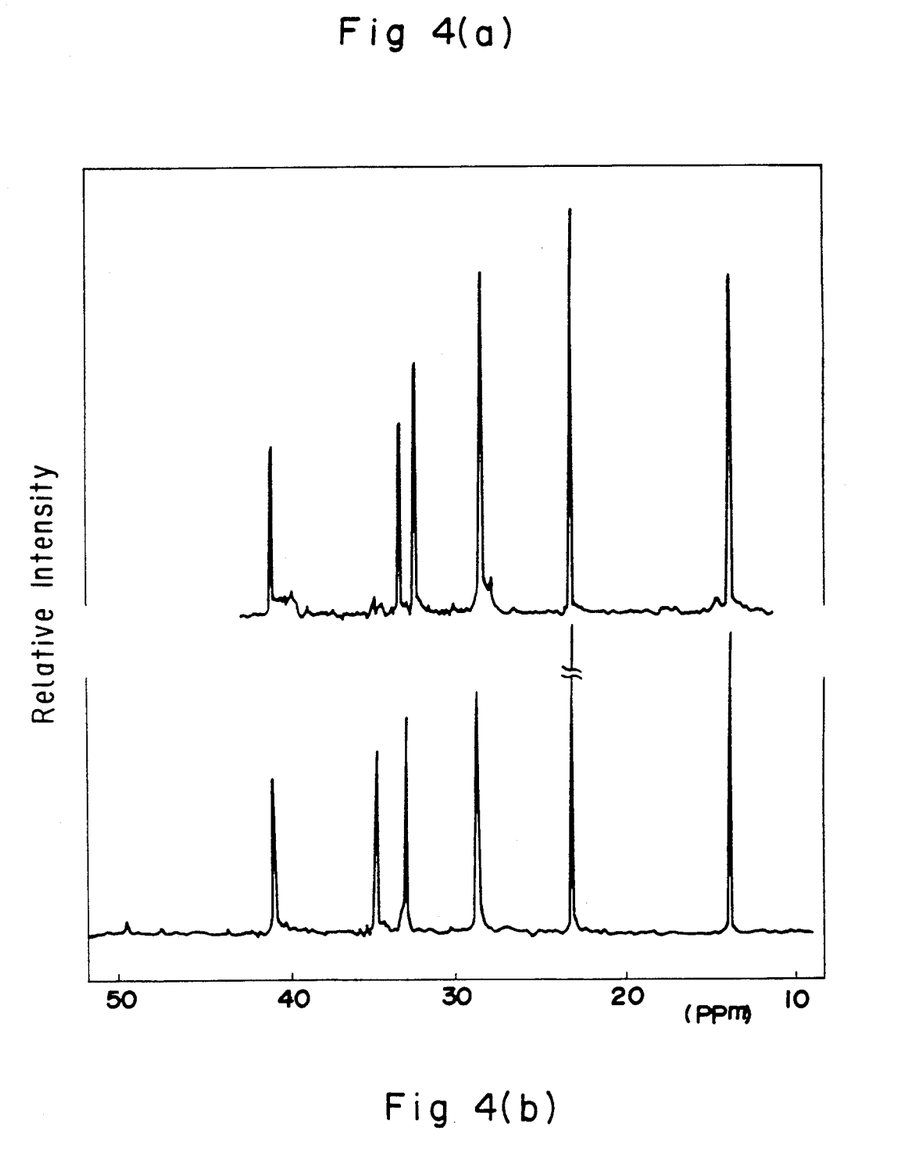
Figure 5:
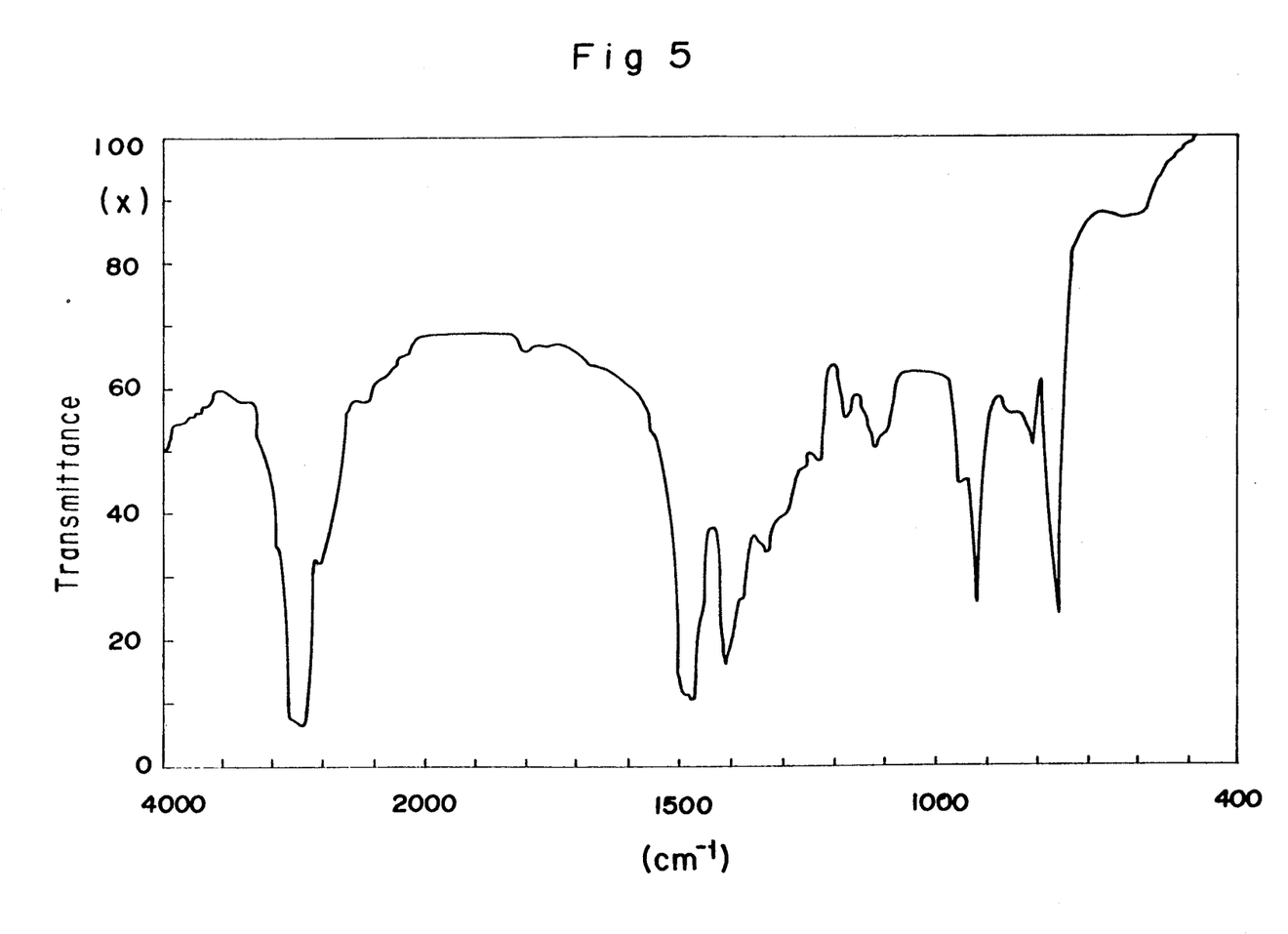
FIG. 5 indicates the infrared absorption spectrum of the syndiotactic polyhexene-1, while FIG. 6 gives that of the isotactic polyhexene-1.

Among the absorptions of the side chain $CH_2$ groups directly bonded the main chain, the intensity of absorption by the syndiotactic bonds at 34.7 ppm was 0.65 relative to the sum of the intensities of total absorptions by the side chain $CH_2$ groups directly bonded to the main chain. The measurements of the $^{13}C$-NMR absorption spectrum are shown in FIG. 4 (a), while those of the infrared absorption spectrum are given in FIG. 5.

Figure 6:
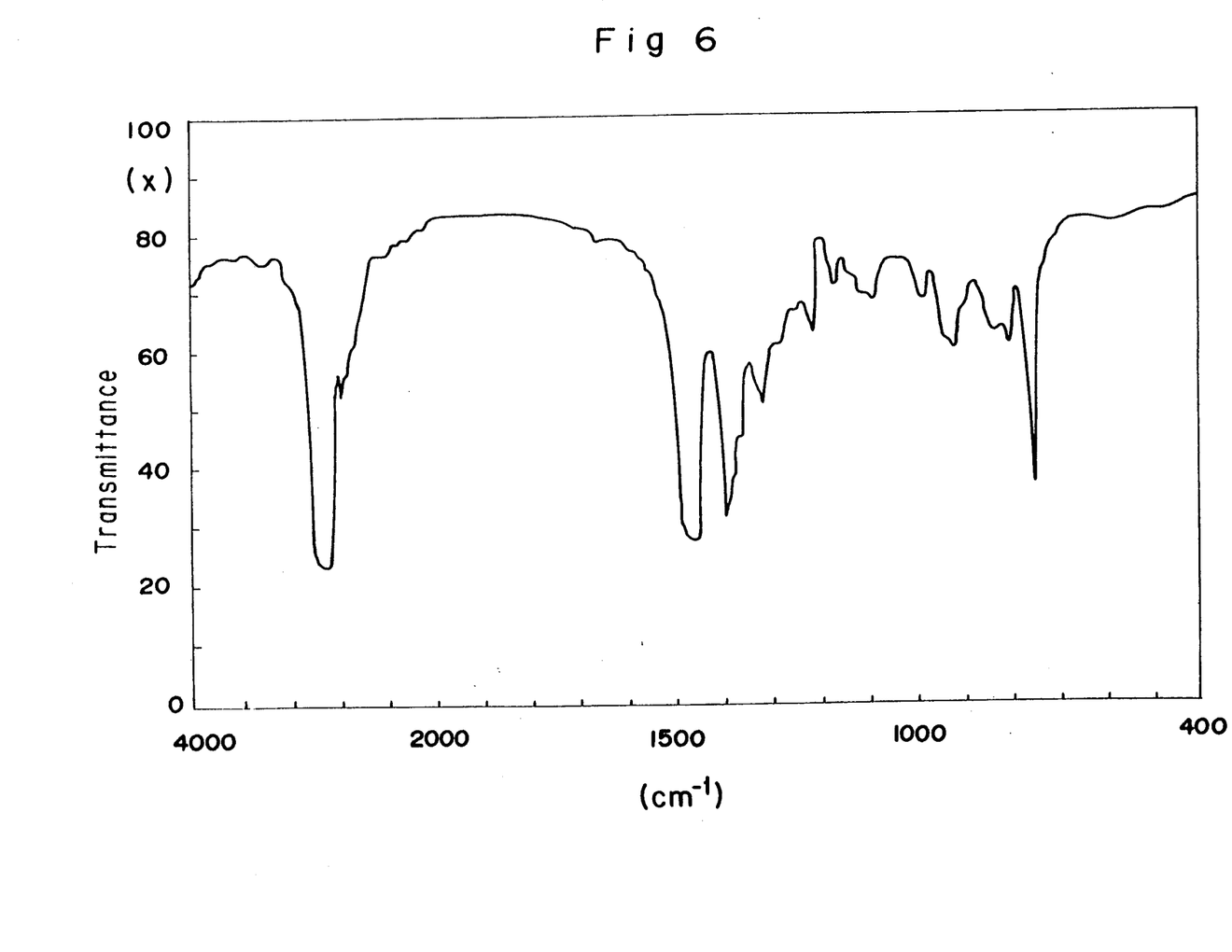

Isotactic polyhexene-1 could be obtained through polymerization catalyzed by 1,2-ethylenebisindenylzirconium dichloride according to the same procedure. Its $^{13}C$-NMR absorption spectrum was measured similarly, whereby 6 absorption peaks were observed at around 14.0, 23.5, 29.2, 33.6, 35.3 and 41.4 ppm. The measurements of the $^{13}C$-NMR spectrum are shown in FIG. 4 (b), while those of the infrared absorption spectrum are illustrated in FIG. 6.

EXAMPLE 4

A polymer was obtained in an amount of 47.7 g in the same manner as in Example 2, except that 100 g of octene-1, in place of pentene-1, was polymerized at 25° C. for 4 hours. The polymer was analyzed in the same manner and was found to have a number average molecular weight of 29,600 and a weight average molecular weight of 62,100, as calcultated as polypropylene. According to the $^{13}C$-NMR analysis, 8 main absorption peaks were observed at around 13.9, 22.9, 27.0, 30.2, 32.2, 33.8, 35.0 and 42.2 ppm.

Figure 7A:
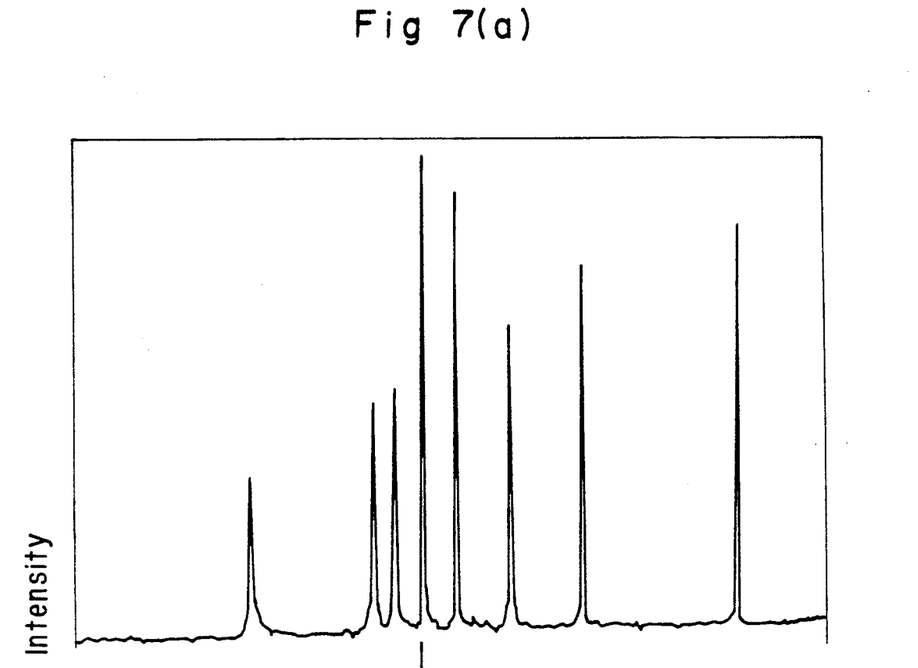
Figure 8:
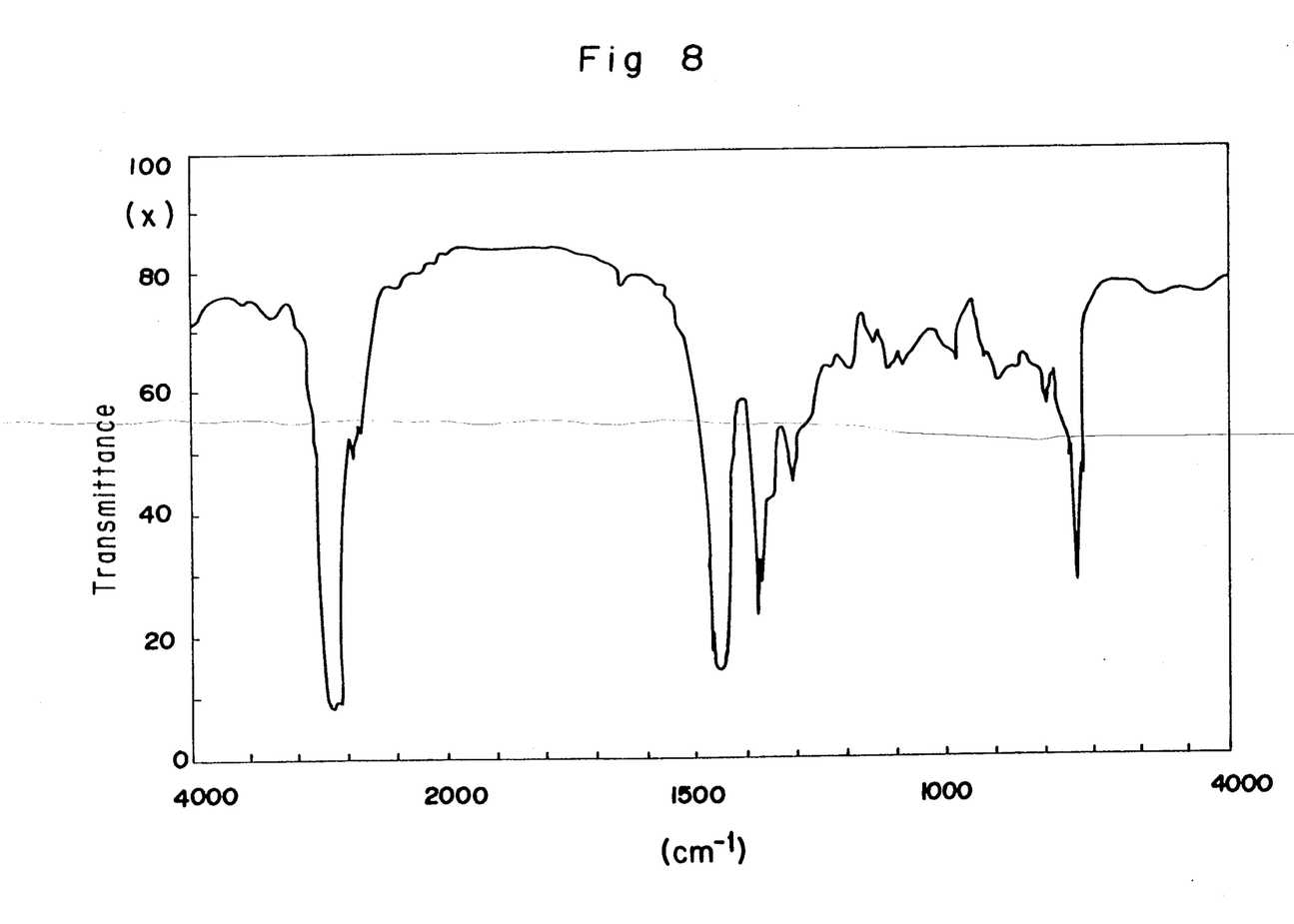

Among the absorptions by the side chain $CH_2$ groups directly bonded to the main chain, the intensity of absorption by the syndiotactic bonds at 35.0 ppm was 0.67 as ralative to the sum of the intensities of absorption by the $CH_2$ groups directly bonded to the main chain of all the side chains. The measurements of the $^{13}C$-NMR absorption spectrum are shown in FIG. 7 (a), while those of the infrared absorption spectrum are given in FIG. 8.

Isotactic polyoctene-1 could be obtained in an amount of 33.2 g through polymerization catalyzed by 1,2-ethylenebis-indenylzirconium dichloride according to the same procedure. Its $^{13}C$-NMR spectrum was measured similarly and 8 absorption peaks were observed at around 13.9, 22.8, 27.0, 30.2, 32.2, 33.6, 35.7 and 42.4 ppm.

Figure 7B:
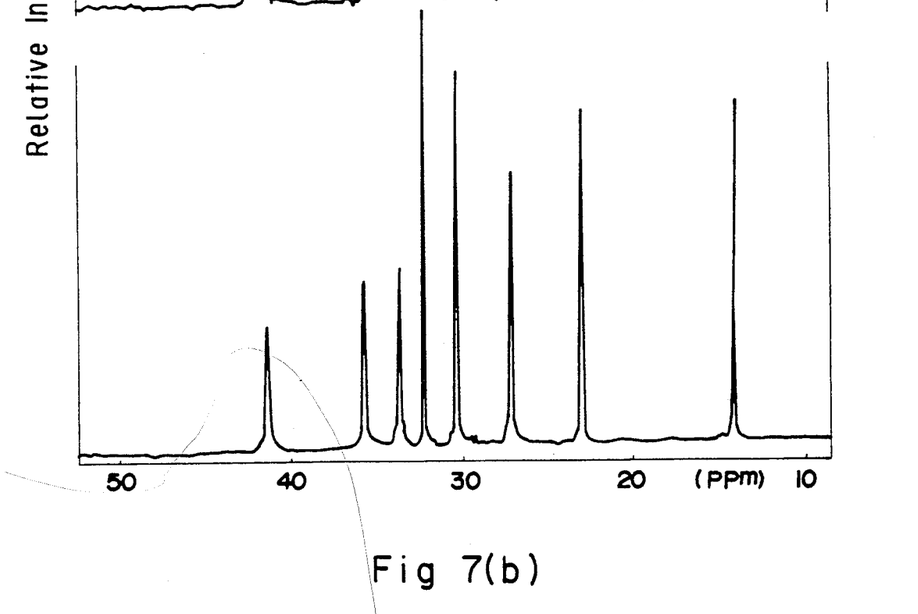
Figure 9:
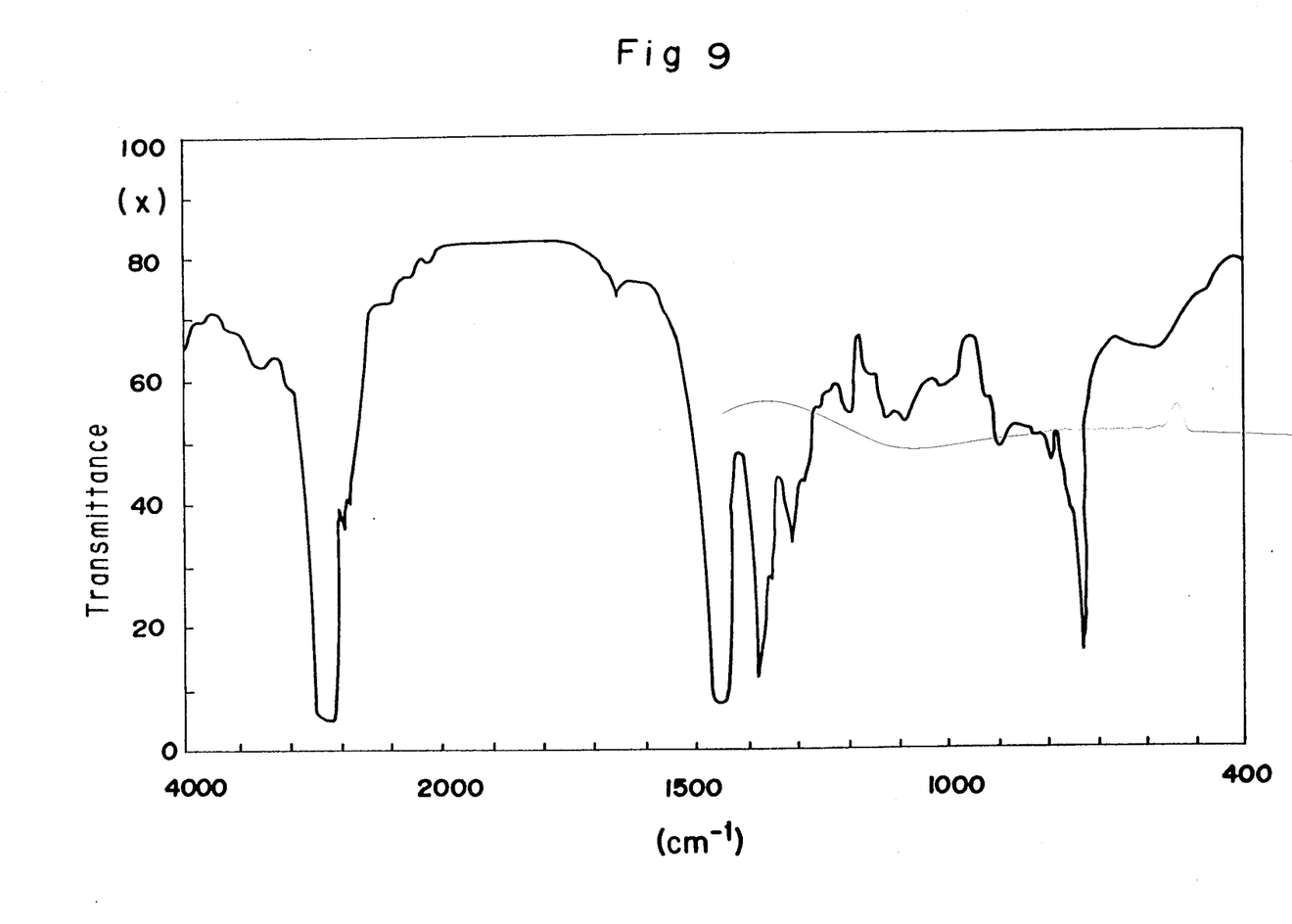
FIG. 9 shows that of the isotactic polyoctene-1.

The measurements of the $^{13}C$-NMR spectrum and those of the infrared absorption spectrum are shown in FIG. 7 (b) and FIG. 9, respectively.

EXAMPLE 5

Polyhexadecene-1 was obtained in an amount of 4.7 g in the same manner as in Example 2, except that 40 g of hexadecene-1, in place of pentene-1, was polymerized at 30° C. for 7 hours. The analysis of the polymer conducted in the same manner clarified that it had a number average molecular weight of 15,000 and a weight average molecular weight of 30,000, as calculated in terms of polypropylene. In the $^{13}C$-NMR spectrum, 8 well-separated peaks were observed at around 14.0, 22.8, 27.1, 30.7, 32.1, 33.8, 35.1 and 42.3 ppm, but the peaks found at 29.5 to 30.2 ppm were poorly separated. In accordance with differential scanning thermal analysis, the polymer was molten at 140° C. and the temperature was then lowered at a rate of 10° C./minute, in which case the crystallization temperature measured as a peak temperature was 12.7° C. and the melting points determined in the course of increasing the temperature were 19.7° C. and 40.0° C.

Figure 10A:
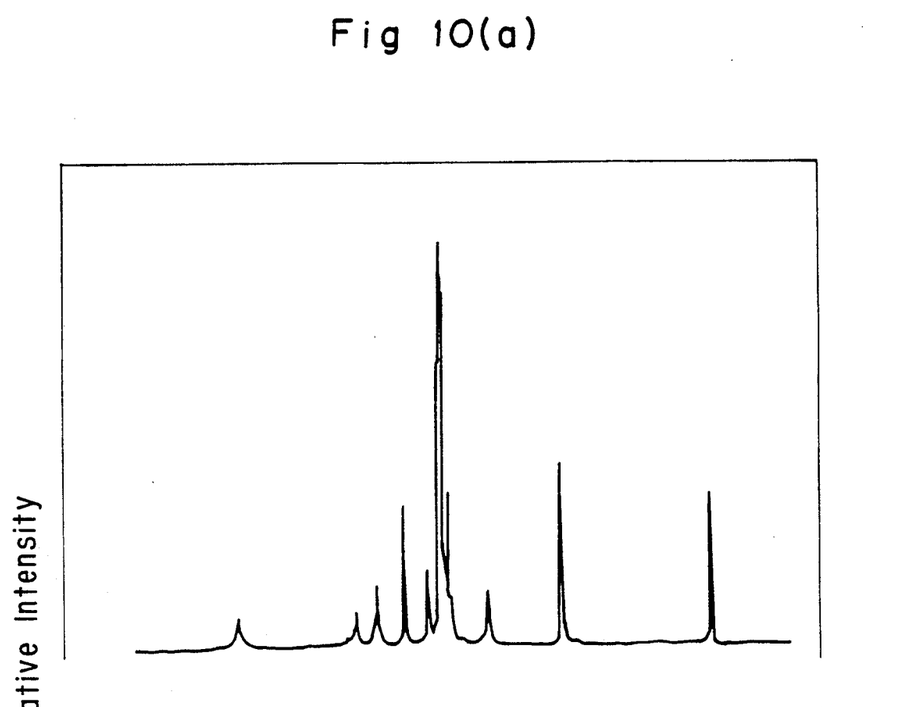
Figure 11:
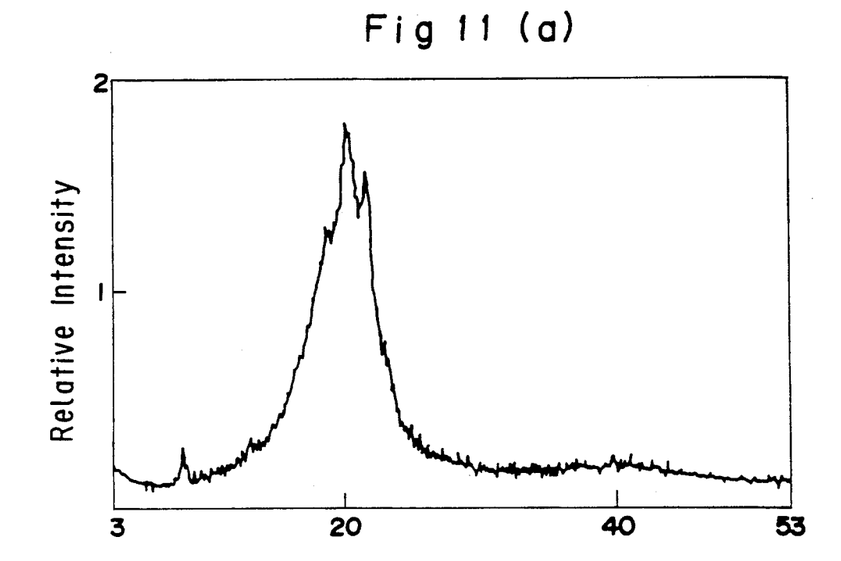

Among the absorptions by the side chain $CH_2$ groups directly bonded to the main chain, the intensity of absorption by the syndiotactic bonds at 35.1 ppm was 0.66 relative to the sum of the total intensities of absorption by the side chain $CH_2$ groups directly bonded to the main chain. The measurements of the $^{13}C$-NMR absorption spectrum and those of the X-ray diffraction (Cu—Kα) are given in FIG. 10 (a) and FIG. 11 (a), respectively.

Figure 10B:
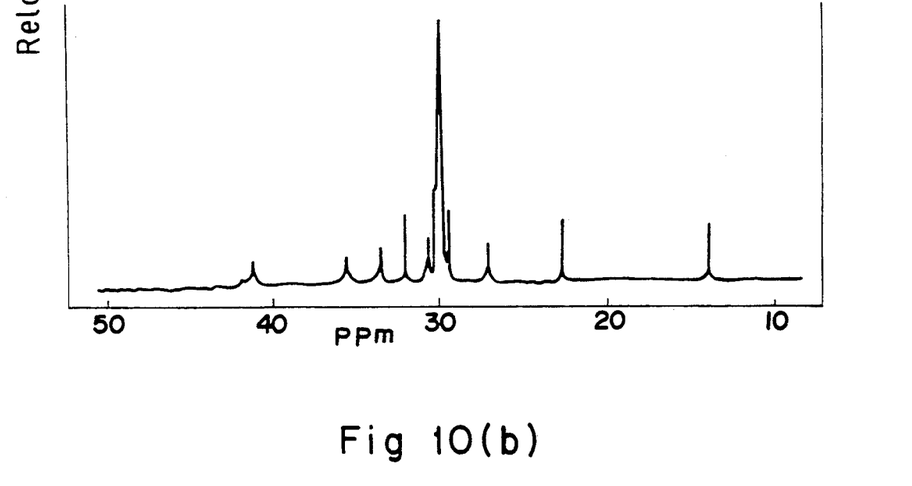

Isotactic polyhexadecene-1 could be obtained in an amount of 32.8 g through polymerization catalyzed by 1,2-ethylenebis-indenylzirconium dichloride by the same procedure. Its $^{13}C$-NMR spectrum was measured similarly, as a result of which 8 well-separated peaks were observed at around 14.0, 22.8, 27.1, 30.7, 32.1, 33.8, 35.7, and 41.4 ppm, but the peaks found at 29.5 to 30.0 ppm were poorly separated. The crystallization temperature was 30.2° C. and the melting points were 52.0° C. and 57.3° C., as measured in the same manner. The measurements of the $^{13}$C-NMR spectrum are illustrated in FIG. 10 (b), while those of the X-ray diffraction spectrum (Cu—Kα) are given in FIG. 11 (b).

EXAMPLE 6

Polyoctadecene-1 was obtained in an amount of 3.6 g through polymerization in the same manner as in Example 2, except that 40 g of octadecene-1, in place of pentene-1, was polymerized at 30° C. for 7 hours. The analysis of the polymer conducted in the same manner revealed that the number average molecular weight was 16,000 while the weight average molecular weight was 32,000, both calculated as polypropylene. In the $^{13}$C-NMR spectrum, 8 well-separated peaks were observed at around 13.9, 22.8, 27.0, 30.7, 32.4, 33.8, 35.1 and 42.3 ppm, but the peaks found at 29.2 to 30.2 ppm were poorly separated. In accordance with differential scanning thermal analysis, the polymer was molten at 140° C. and the temperature was then lowered at a rate of 10° C./minute, in which case the crystallization temperatures measured as peak temperatures were 22.3° C. and 12.0° C. and the melting points determined in the course of increasing the temperature were 15.9° C. and 31.9° C.

Figure 12A:
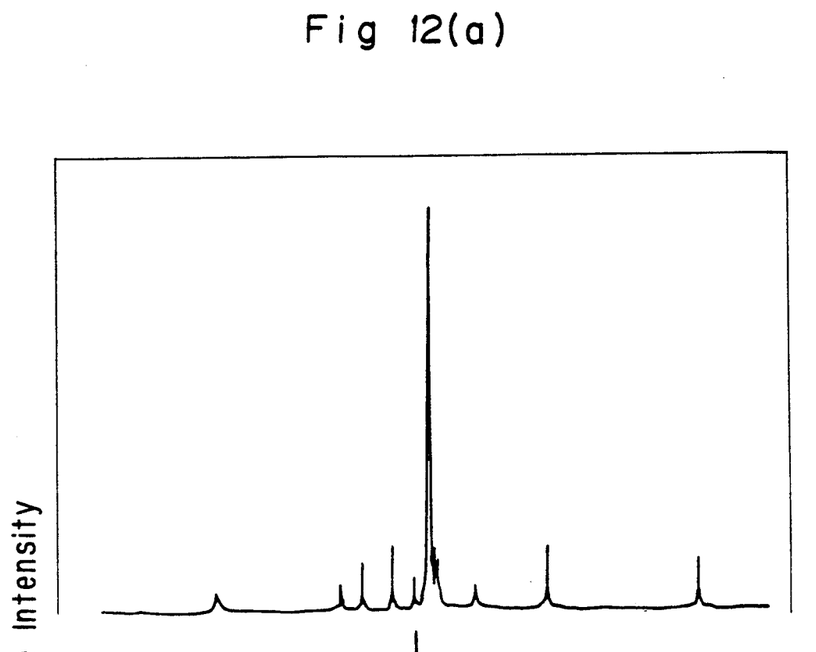
Figure 13:
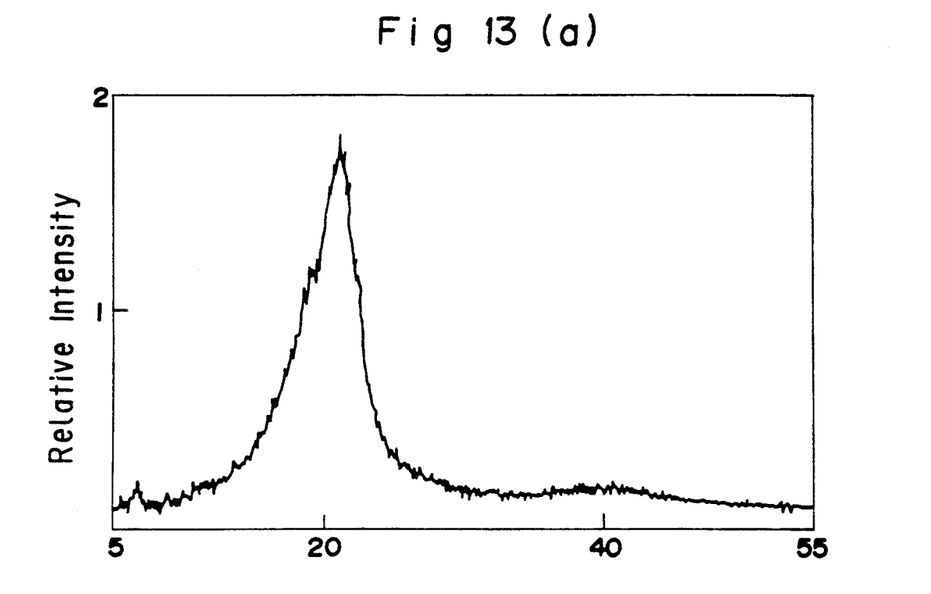

Among the absorptions by the CH$_2$ side chain groups directly bonded to the main chain, the intensity of absorption by the syndiotactic bonds at 35.1 ppm was 0.68 relative to the sum of the intensities of absorption by the whole side chain CH$_2$ groups directly bonded to the main chain. The measurements of the $^{13}$C-NMR absorption spectrum are shown in FIG. 12 (a), while those of the X-ray diffraction (Cu—Kα) are given in FIG. 13 (a).

Figure 12B:
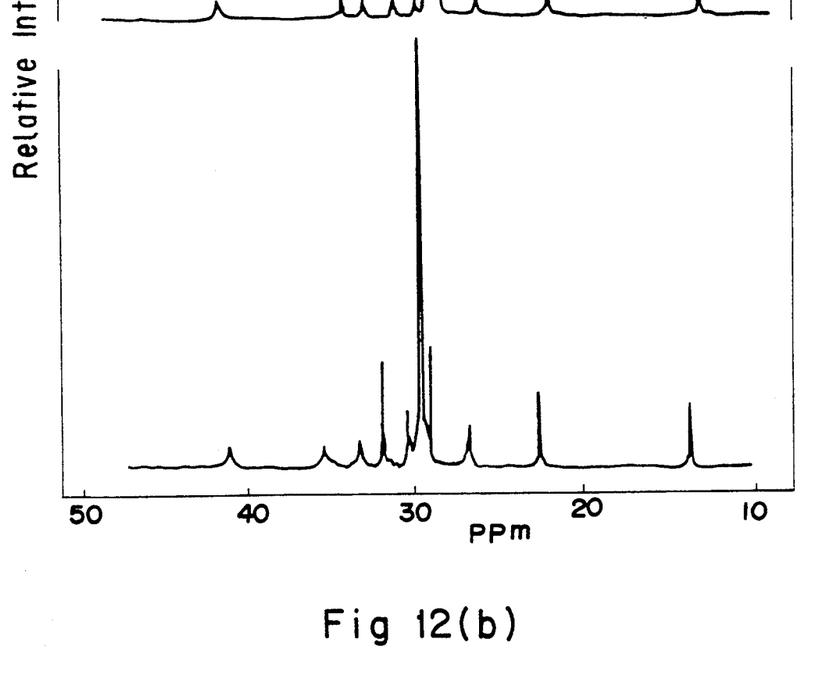

Isotactic polyoctadecene-1 was obtained in an amount of 33.9 g through polymerization catalyzed by 1,2-ethylenebisindenyl-zirconium dichloride according to the same procedure. Its $^{13}$C-NMR spectrum was measured similarly, with the result that 8 well-separated peaks were observed at around 14.0, 22.8, 27.1, 30.8, 32.1, 33.5, 35.7 and 41.4 ppm, but the peaks found at 29.5 to 30.0 ppm were poorly separated. The crystallization temperature was 36.3° C. and the melting points were 26.7° C. and 62.0° C., as measured in the same way. The measurements of the $^{13}$C-NMR spectrum and those of the X-ray diffraction (Cu—Kα) are shown in FIG. 12 (b) and FIG. 13 (b), respectively.

EXAMPLE 7

Isopropyl(cyclopentadienyl-1-fluorenyl)hafnium dichloride was synthesized by introducing lithium into isopropylcyclopentadienyl-1-fluorene and reacting the resulting compound with hafnium tetrachloride (a mixture comprising zirconium tetrachloride and hafnium tetrachloride with a weight ratio of 1.5 zirconium/98.5 hafnium), instead of zirconium tetrachloride. Then, the procedures of Example 1 were followed except for the use of the isopropyl(cyclopentadienyl-1-fluorenyl)hafnium dichloride in place of isopropyl-(cyclopentadienyl-1-fluorenyl)zirconium dichloride, thereby producing 0.8 g of polybutene-1. It was analyzed in the same manner and hence was found to have a number average molecular weight of 29,000 and a weight average molecular weight of 114,000, as calculated as polypropylene. Its intrinsic viscosity measured at 135° C. in a tetralin solution was 0.47. According to the $^{13}$C-NMR analysis, the intensity of absorption by the syndiotactic pentad bonds was 0.72 relative to the sum of the intensities of absorption by the all side chain CH$_2$ groups directly bonded to the main chain.

We claim:

1. A poly-α-olefin which is an addition polymer of a straight chain α-olefin having 4 carbon atoms or more, wherein (a) by the analysis of the peaks attributable to the side chain methylene groups directly bonded to the main chain in the $^{13}$C-NMR spectrum produced by the measurement in 1,2,4-trichlorobenzene, (i) a main peak not attributable to the isotactic structure thereof is positioned on the side of higher magnetic field than is the peak attributable to the isotactic structure, and (ii) the intensity of said main peak is 0.3 or more relative to the sum of the intensities of the total peaks attributable to the side chain methylene groups directly bonded to the main chain, and (b) the number-average molecular weight measured by gel permeation chromatography and calculated in terms of polypropylene is not less than 1,000.

2. The poly-α-olefin according to claim 1 wherein in the peaks attributable to the side chain methylene groups directly bonded to the main chain in the $^{13}$C-NMR spectrum, the intensity of said main peak is 0.5 or more relative to the sum of the intensities of the total peaks attributable to the side chain methylene groups directly bonded to the main chain.

3. The poly-α-olefin according to claim 1 wherein the α-olefin is octadecene-1 and in the peaks attributable to the methylene groups directly bonded to the main chain in the side chains in the $^{13}$C-NMR spectrum, the intensity of said main peak is 0.4 or more relative to the sum of the intensities of the total peaks attributable to the side chain methylene groups directly bonded to the main chain.

4. The poly-α-olefin according to claim 2 wherein the α-olefin is butene-1.

5. The poly-α-olefin according to claim 2 wherein the α-olefin is hexene-1.

6. The poly-α-olefin according to claim 2 wherein the α-olefin is octene-1.

7. The poly-α-olefin according to claim 2 wherein the α-olefin is pentene-1.

8. The poly-α-olefin according to claim 2 wherein the α-olefin is hexadecene-1.

* * * * *